United States Patent [19]

Schuff et al.

[11] Patent Number: 5,239,920
[45] Date of Patent: Aug. 31, 1993

[54] CAN CRUSHER APPARATUS

[76] Inventors: David A. Schuff, 4302 W. Acoma;
Roy C. Burnett, 4635 W. Dailey, both
of Glendale, Ariz. 85306

[21] Appl. No.: 719,922

[22] Filed: Jun. 24, 1991

[51] Int. Cl.⁵ .............................................. B30B 9/32
[52] U.S. Cl. ...................................... 100/45; 100/91;
100/902; 194/208
[58] Field of Search ........................ 100/45, 48, 90, 91,
100/152, 156, 902, 49; 194/205, 208, 209, 213;
406/79, 109, 130, 145, 151, 153, 163, 168, 171,
174, 175, 196

[56] References Cited

U.S. PATENT DOCUMENTS

| | | | |
|---|---|---|---|
| 4,179,018 | 12/1979 | Miller | 100/45 X |
| 4,241,821 | 12/1980 | Wu et al. | 100/902 X |
| 4,463,844 | 8/1984 | Hufman et al. | 100/902 X |
| 4,480,737 | 11/1984 | Jamgochian et al. | 100/902 X |
| 4,576,289 | 3/1986 | Jarrett et al. | 100/902 X |
| 4,989,507 | 2/1991 | Rhoades et al. | 100/902 X |

Primary Examiner—Stephen F. Gerrity
Attorney, Agent, or Firm—H. Gordon Shields

[57] ABSTRACT

Can crusher apparatus includes a cylindrical housing and a can receiving slot in a lower portion of the cylindrical housing. Cans fall into a conveyor belt which transmits or transports the cans to a conduit which conveys the cans upwardly and to a crusher. Ferrous cans remain in the conveyor by magnetic elements and move off the conveyor and are discarded. After being crushed, the cans are transported upwardly by air pressure or a moving air stream to the upper portion of the housing where they remain until they are transported out of the apparatus. The cans are moved out of the apparatus by air pressure which is the exhaust portion of the air pressure applied to the conduit which transports the cans from the conveyor to the crusher.

19 Claims, 5 Drawing Sheets

CAN CRUSHER APPARATUS

BACKGROUND OF THE INVENTION

1. Field of the Invention

This invention relates to can crusher apparatus and, more particularly, to recycling apparatus which receives cans and crushes the cans for recycling.

2. Description of the Prior Art

U.S. Pat. No. 4,989,507 (Rhodes et al) discloses can crushing apparatus for collecting and crushing cans. The apparatus includes a conveyor belt onto which cans are dropped. The conveyor belt includes magnetic elements for holding onto ferrous cans. Two vacuum conduits are disposed above the conveyor. The first conduit receives aluminum cans, and the second conduit receives the ferrous cans. The ferrous cans are released from the conveyor to the conduit beyond a location in which the magnetic elements terminate. Both aluminum cans and ferrous cans are conveyed upwardly to the top of the apparatus where they are crushed. Refuse which may inadvertently be associated with the cans is separated from the cans and is discharged out of the apparatus.

SUMMARY OF THE INVENTION

The invention described and claimed herein comprises apparatus for receiving cans, for crushing the cans, and for storing the crushed cans and delivering the crushed cans from the storage area. Only aluminum cans are crushed for recycling. Ferrous cans are discarded. The cans are crushed in a lower portion of the apparatus, and the crushed cans are transmitted upwardly to a storage area. The cans are moved to the crusher by vacuum force, and the exhaust portion of the vacuum source is used to move the crushed cans up into and then out of the storage area for delivery to a recycling area.

Among the objects of the present invention are the following:

To provide new and useful can crusher apparatus;

To provide new and useful can crusher apparatus for crushing aluminum cans;

To provide new and useful can crusher apparatus which rejects ferrous cans and accepts only aluminum cans;

To provide new and useful can crusher apparatus in which crushed cans are stored above crusher elements; and To provide new and useful apparatus for transmitting cans by vacuum power and for transmitting crushed cans by the exhaust from the vacuum power.

DESCRIPTION OF THE PREFERRED EMBODIMENT

Figure 1:
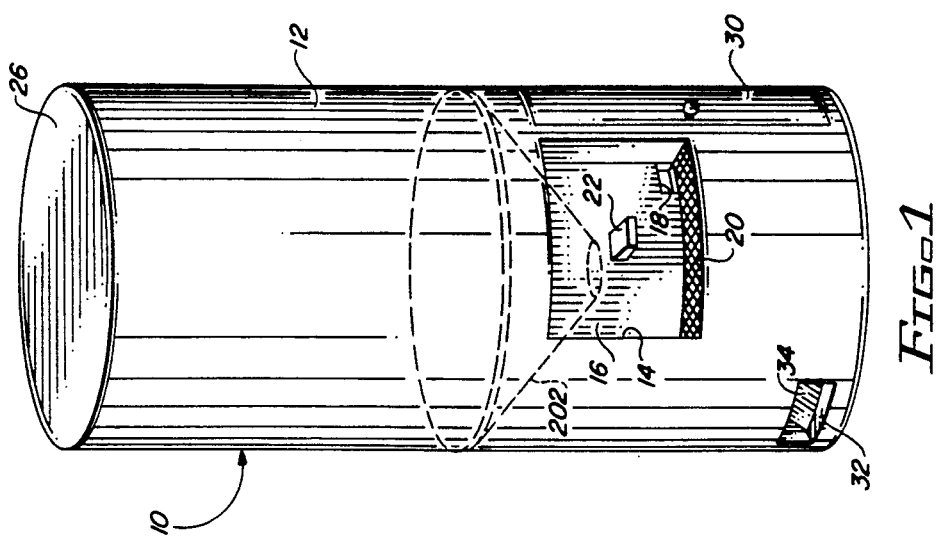
FIG. 1 is a perspective view of the external elements of the apparatus of the present invention.

FIG. 1 is a perspective view of can crusher apparatus 10 embodying the present invention. The apparatus 10 includes a generally cylindrical housing 12 in which various elements are disposed. The housing 12 includes a recess or opening 14 in which there is disposed a receiving cabinet 16. The receiving cabinet 16 includes a can receiving opening 18 through which cans are pushed by user of the apparatus for crushing for later recycling.

The lower portion of the cabinet 16 includes a mesh bottom 20. Any liquids, etc., may drain through the mesh bottom and into the interior of the housing 12.

A coin dispenser element 22 is secured to the cabinet 16. The dispenser 22 dispenser coins in payment for receipt of cans.

An access door 30 is secured to the housing 12 to provide access to the interior of the housing. At the lower portion of the housing 12, and spaced apart downwardly from, but reasonably adjacent to, the recess 14 and its receiving cabinet 16, is a discharge chute opening 32. A discharge chute 34 communicates with the opening 32. Steel, or ferrous, cans, and other trash, are discharged through the opening 32 from the chute 34. This will be explained in more detail in conjunction with FIGS. 2 and 3.

Figure 2:
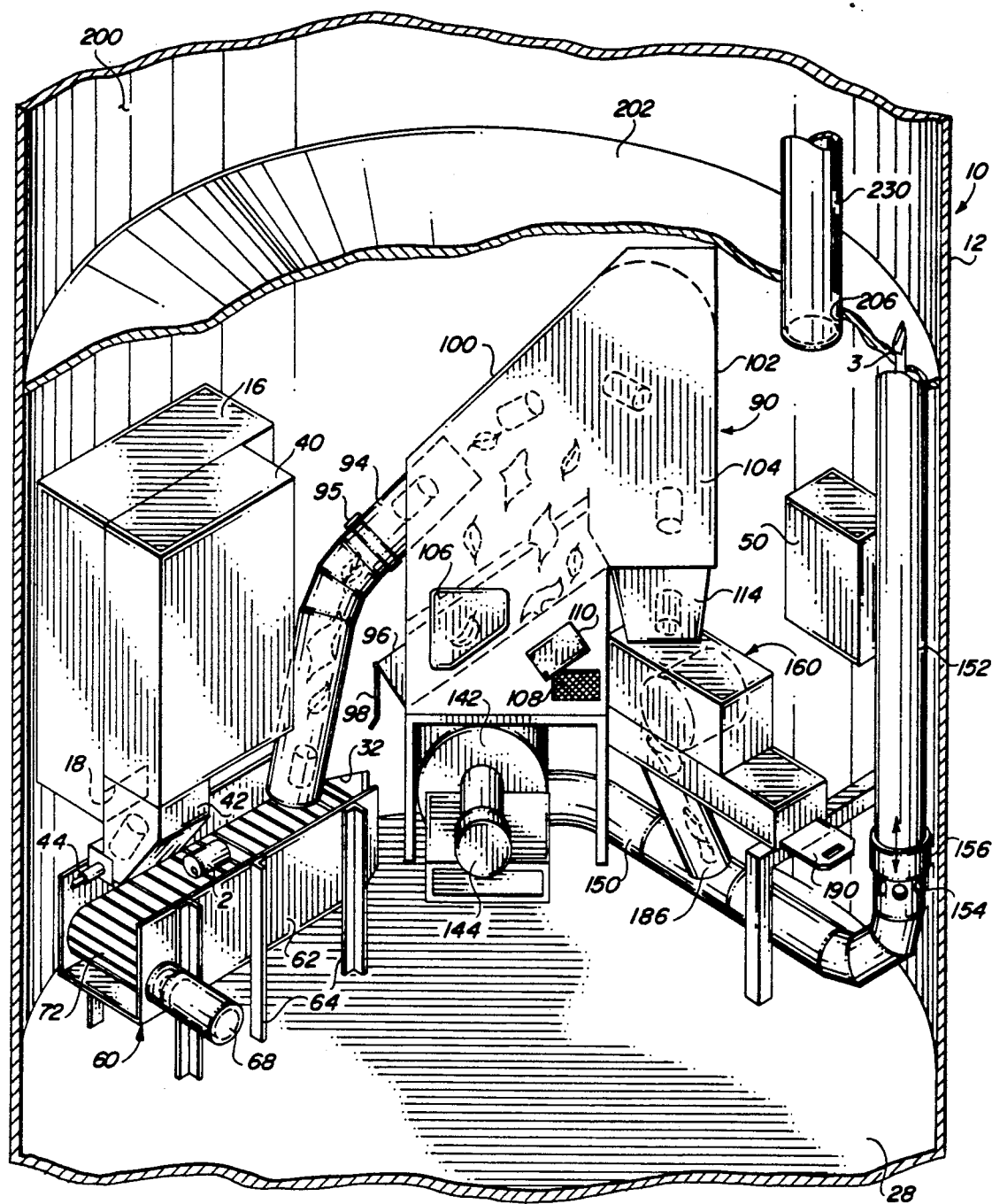
FIG. 2 is a perspective view of the interior of a portion of the apparatus of FIG. 1.

FIG. 2 is a view in partial section through a portion of the housing 12 showing some of the elements or assemblies within the lower portion of the housing 12. The receiving cabinet 16 is shown secured to the cylindrical housing 12, and a control cabinet 40 is shown secured to the receiving cabinet 16. Various mechanical and electronic elements for operating the apparatus 10 are disposed in the control cabinet 40. The coin and receipt dispenser 22 is appropriately secured to the control cabinet 40, and extends from the control cabinet into the interior of the receiving cabinet 16, as shown in FIG. 1.

At the lower portion of the control of cabinet 40 is a receiving chute 42. The receiving chute 42 receives cans pushed through the opening 18. A photo sensor 44 is secured to the receiving chute 42 for sensing the input of cans through the opening 18 and into the chute 42. A signal from the photo sensor 44 is communicated to the appropriate control circuitry within the cabinet 40 to commence the operation of the various elements of the apparatus of the present invention.

Figure 3:
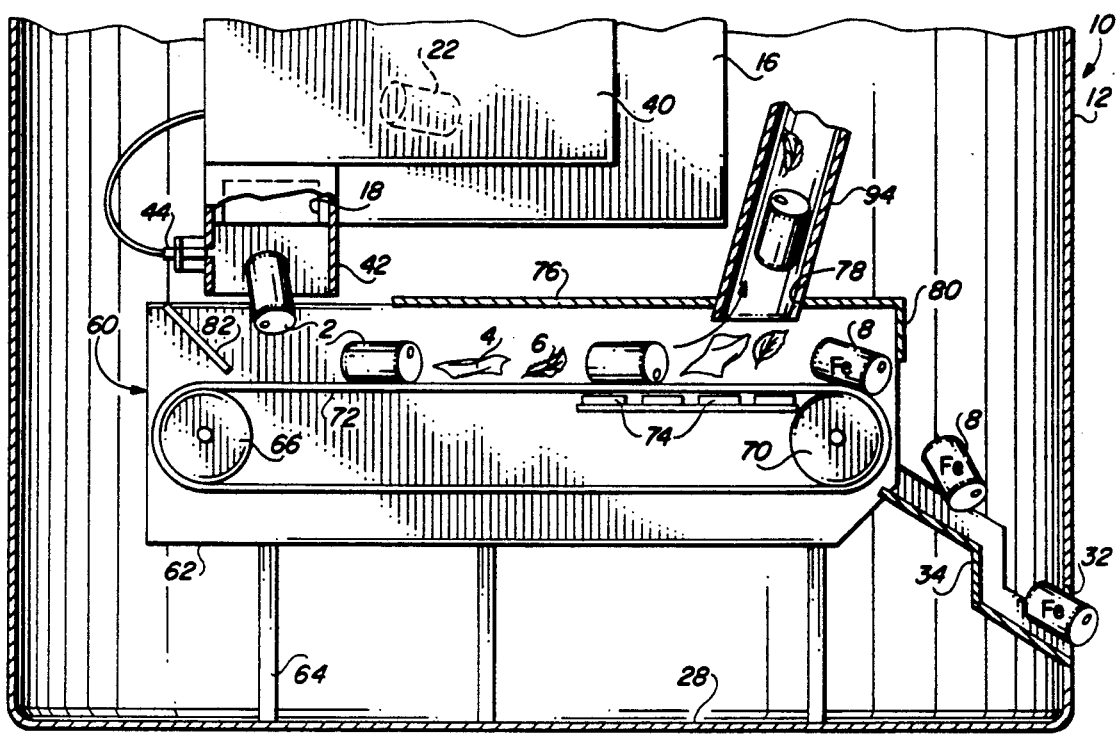
FIG. 3 is a side view in partial section of a portion of the apparatus of the present invention.

Beneath the receiving chute 42 is a conveyor system 60. The conveyor system 60 is shown in FIG. 2 and is also shown in more detail in FIG. 3. FIG. 3 comprises a side schematic representation of the conveyor system 60, along with associated elements, such as a receiving cabinet 16 and the control cabinet 40 and the receiving chute 42. For the following discussion of the conveyor system 60, reference will be made to both FIGS. 2 and 3.

The conveyor system 60 includes a housing 62 which is appropriately supported upwardly from a bottom 28 of the housing 12 by a plurality of legs 64. Appropriately secured within the housing 62 is a pair of rotatable drums 66 and 70. An electric motor 68 is appropriately connected to the drum 66 for rotating the drum 66.

A segmented belt 72 is disposed over the drums 66 and 70. The drum 70 is an idler drum in that it is freely rotatable on its axis. The segmented belt 72 extends over both the driving drum 66 and the idler drum 70.

Beneath the belt 72 and adjacent to the drum 70 is a plurality of magnets 74. The purpose of the magnets 74 is to magnetically hold any ferrous metal or steel cans that are pushed through the opening 18 and drop onto the conveyor belt 70. The magnets hold the ferrous metal cans onto the belt so that those cans will not be conveyed through the crusher apparatus. Rather, such cans will fall off the end of the belt 72 and onto the discharge chute 34 and out through the discharge opening 32. See also FIG. 1.

The conveyer system 60 includes a top plate 76 which is spaced above the belt 72 a sufficient distance so that cans falling onto the conveyor 72 will not be interfered with by the top plate 76. The top plate 76 includes an aperture 78 to which a can intake conduit 94 extends. The is an end plate 80 which extends downwardly from the top plate 76 adjacent to the idler drum 70.

At the opposite end of the conveyor system 60 from the end plate 80, there is a deflector plate 82. The deflector plate 82 is disposed adjacent to the belt 72 and adjacent to the drum 66 and adjacent to the receiving chute 42. The purpose of the deflector plate 82 is simply to help deflect any cans from the receiving chute 42 onto the conveyor belt 72.

The purpose of the plates 76 and 80 is primarily to help direct the flow of air into the conduit 94 to convey the aluminum cans upward from the conveyor belt 72. This will be discussed in more detail below.

In FIG. 3, a plurality of aluminum cans 2 are shown. One aluminum can 2 is shown falling from the receiving chute 42 onto the belt 72. Two aluminum cans 2 are shown on the conveyor belt 72. Between the two cans 2 on the belt 72 is trash, including a plastic bag 4 and leaf 6. The plastic bag 4 and leaf 6 are simply symbolic or representative of trash which may fall onto the conveyor belt 72 along with the cans 2.

Also shown in FIG. 3 are three steel or ferrous metal cans 8. The cans 8 are shown falling off the end of the conveyor belt 72 adjacent to the discharge chute 34 and out of the apparatus 10 through the discharge chute opening 32.

Referring again to FIG. 2, it will be noted that various elements of the conveyor system 60 are omitted in FIG. 2 for purposes of clarity. Thus, the top plate 76, the deflector plate 82 and the end plate 80 are not shown in FIG. 2. Rather, the belt 72, a segmented belt, is shown in more detail in FIG. 2 than in FIG. 3.

Figure 4:
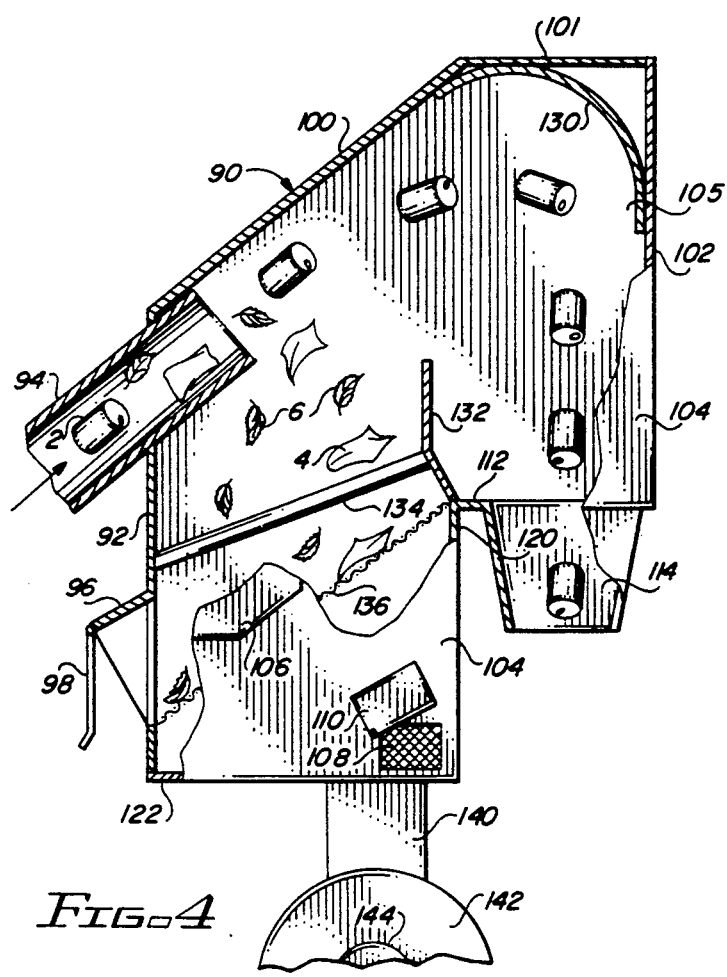
FIG. 4 is a schematic representation of part of the vacuum conveying system of the apparatus of the present invention.

The intake conduit 94 extends from the conveyor system 60 to a plenum chamber 90. The plenum chamber or plenum 90 is shown in FIG. 2 and is shown in more detail in FIG. 4. FIG. 4 is a side view in partial section of the plenum 90. For the following discussion, reference will primarily be made to FIGS. 2 and 4.

The plenum 90 includes a front wall 92 through which the intake conduit 94 extends. The intake conduit 94 actually extends through the front wall 92 and into the interior of the plenum 90. At the lower portion of the front wall 92 there is a trash drop chute 96. Trash, such as the bag 4 and the leaf 6, shown also in FIG. 3, is discharged from the plenum 90 through the chute 96. A door 98 is pivotally secured to the chute 96. In FIG. 4, the door 98 is shown open to allow the trash to be discharged from the plenum 90.

The door 98 opens by gravity and is closed by the suction or low pressure force of a blower, as will be discussed below. When the blower is off, the door 98 opens automatically and any accumulated thrash may fall out of the plenum 90 through the chute 96.

The plenum 90 also includes a top wall. The top wall includes two portions, a sloping portion 100 adjacent to the intake chute 90 and a generally horizontal portion 101 remote from the intake chute 94. The plenum 90 also includes an upper rear wall 102 and a pair of side walls 104 and 105.

The side wall 104 includes an access or clean out door 106 which provides access to the interior of the plenum 90 for purposes of removing trash that does not drop through the chute 96, etc.

The side wall 104 also includes a screened opening 108 at the lower part or portion of the wall. A pivoting plate 110 is disposed adjacent to the screened opening 108. The plate 102 pivots to cover as much of the screen 108 as desired for control of air flowing into the plenum 90. Essentially, the purpose of the plate 110 and the opening 108 is to control the velocity of the airflow through the conduit 94 and into the plenum 90. Air flowing through the intake conduit 94 causes the cans to move from the conveyor belt 72 upwardly into the conduit 94 and into the interior of the plenum 90.

A can counter 95 is secured to the conduit 94 adjacent to the plenum 90. The can counter is shown in FIG. 2. The can counter 95 comprises a coil which inductively senses the passage of a can 2 through the conduit 94 and into the plenum 90.

The plenum 90 includes two bottom walls, and upper bottom 112 to which a can discharge chute 114 is secured, and lower bottom wall 122. An inner rear wall 120 extends between the upper bottom wall 112 and the lower bottom wall 122. The screened opening 108 and the pivoting plate 110 are disposed adjacent to the inner rear wall 120 and the lower bottom wall 122 on the side wall 104. A conduit 140 extends through the bottom wall 122 to a blower housing 142. See FIG. 2.

Within the blower housing 142 is a blower. A blower motor 144 is attached to the blower. The motor 144 is also shown in FIG. 2.

When the blower motor 144 is "on" or running, air is pulled through the intake conduit 94, into the plenum 90, and through the conduit 140 the blower housing 142. The low pressure or suction in the plenum 90 also closes the door 98 on the trash chute 96. Air is discharged from the blower housing 142 through a conduit 150.

Within the plenum 90 is a top deflector plate 130. The deflector plate 130 extends from the upper portion of the back rear wall 102 in a curved manner to the top wall portions 100 and 101. The purpose of the deflector plate 130 is simply to deflect cans 2 that are discharged from the conduit 94 into the plenum 90 downwardly toward the discharge conduit or chute 114. The cans fall by gravity through the rear portion of the plenum 90 and through the discharge conduit or chute 114.

There is a second deflector plate, an inner deflector plate 132, which extends upwardly from about the juncture of the walls 112 and 120 on the interior of the plenum 90. The deflector plate 132 helps to insure that cans on the interior of the plenum fall downwardly toward the chute 114 rather than onto a plurality of bars 134.

The bars 134 extend from the deflector plate 132 downwardly and outwardly toward the front wall 92 of the plenum 90. The bars 134 are spaced apart so as to allow suction airflow through the bars, but the bars 134 serve as a stop for bags 4. However, leaves 6 fall through the bars and onto a sloping screen 136. The leaves 6 then are discharged through the trash discharge or drop chute 96 from the plenum 90 and into a trash container for later removal from the housing 12.

Thus it will be understood that the cans, being heavier than the trash, move from the conduit 94 into the upper portion of the plenum 90 and fall downwardly by gravity through the conduit 114. The trash, being lighter than the cans, flows with the stream of air into the lower portion of the plenum and lands either on the bars 134 or the screen 136. The trash is accordingly separated from the cans by the suction flow of air as the air moves from the conduit 94, through the plenum 90, and through the conduit 140 to the blower 142.

The screen 136 serves as a final barrier for trash and allows the trash to be moved downwardly and outwardly without flowing with the air stream to the lower portion of the plenum 90 and outwardly through the conduit 140 into the blower housing 142. The clean out door 106 is disposed adjacent to the bars 134 and the screen 136 to allow for the periodic cleaning of the bags and other trash which may accumulate within the plenum 30 on the bars 134 or on the screen 136.

Figure 5:
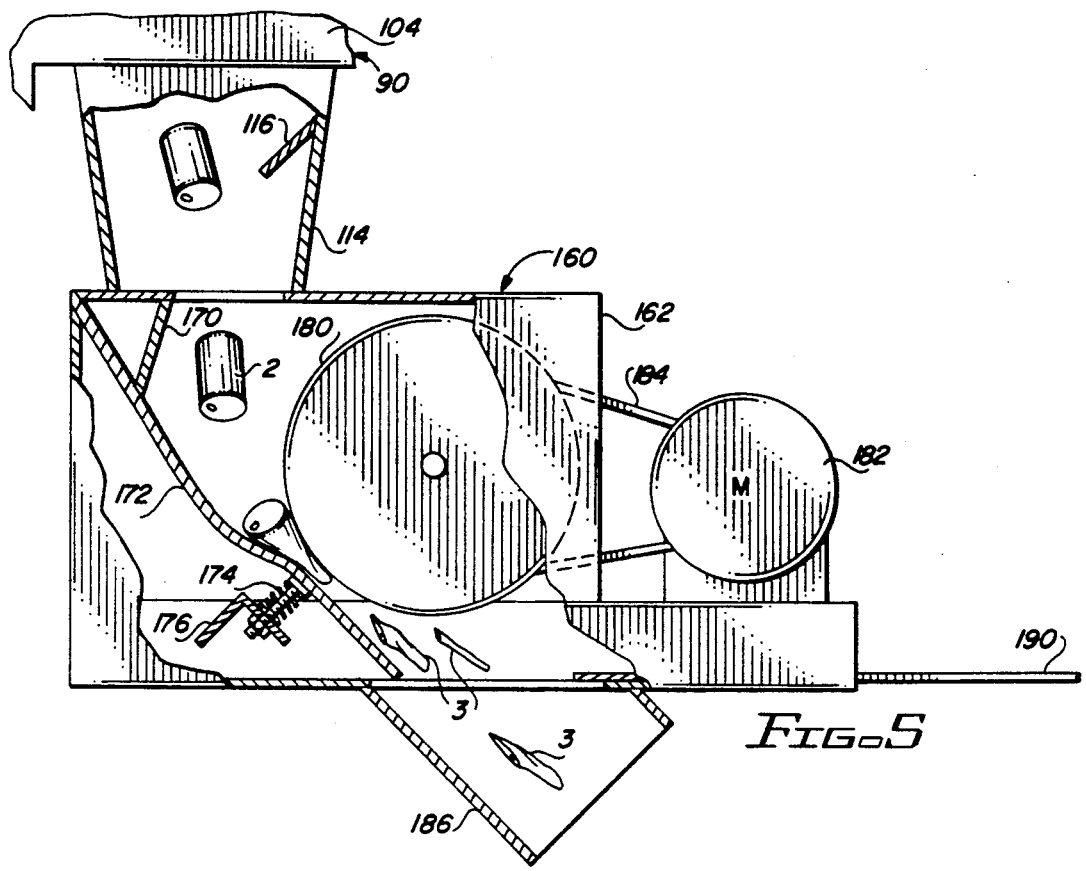
FIG. 5 is a side view of the can crushing elements involved in the apparatus of the present invention.

The can discharge chute 114 extends from the plenum 90 to a can crusher 160. The can crusher 160 is shown in both FIGS. 2 and 5. FIG. 5 is a schematic side representation of the can crusher apparatus 160. For the following discussion, reference will primarily be made to FIGS. 2 and 5:

The can crusher 160 includes a housing 162. The can discharge chute 114 extends to the housing 162. Adjacent to the can discharge chute 114, and appropriately secured within the housing 162, is a deflector plate 170. The deflector plate 170 is disposed adjacent to a striker plate 172. Cans falling through the can discharge chute 114 into the crusher housing 162 fall onto the striker plate 172. The striker plate 172 extends downwardly adjacent to a crusher drum 180. The crusher drum 180 is rotated by a motor 182. The motor 182 is connected to the crusher drum 180 by an appropriate belt 184 through a pulley system, not shown. Such elements, like the elements associated with the blower motor, blower, etc., as discussed above, are well known and understood in the art.

Adjacent to the striker plate 172 is a pressure relief spring and plate 174 connected to a bracket 176. The pressure relief spring and plate 174, which may be simply a compression spring disposed about a bolt shank, with the head of the bolt comprising a "plate" disposed against the striker plate 172. The compression spring extends from the plate or bolt head to the bracket 176. The lower end of the bolt shank extends through a hole or aperture in the bracket and is movable therein in response to the bias of the compression spring and to the movement of the striker plate occasioned by a ferrous metal can or the like. A nut is secured to the bottom of the shank below the bracket, or remote from the compression spring.

The compression spring, through the plate/bolt head provides a positive bias to urge the lower portion of the striker plate 172 towards to outer periphery of the crusher drum 180. However, in case a steel can happens to flow through the intake conduit 94, into the plenum 90, and through the can discharge chute 114 onto the striker plate 172, the spring and plate 174 will allow the striker plate 172 to move away from the drum 180 to prevent damage to the drum and to the striker plate 172. However, aluminum cans will be relatively easily crushed between the drum 180 and the striker plate 172 without damage to either the drum 180 or the plate 172.

The aluminum cans 2, upon being crushed by the drum 180, are flattened, as illustrated in FIG. 5 by reference numeral 3. The flattened cans 3 then move from the can crusher 160 through a conduit 186 which extends to the conduit 150, as shown in FIG. 2.

The crushed cans 3 are thrown by the rotating action of the crusher drum through the conduit 186 and into the conduit 150. In the conduit 150, the cans enter the moving air stream and the combination of the air stream and the in of the cans helps to move the cans around the corner, as it were, and into a vertical conduit 152.

There is a venturi plate, (not shown) in the conduit 150 at the juncture of the conduit 186. One purpose of the venturi plate is to increase the velocity of the air passing the conduit 186 to help accelerate the crushed cans 3 as they are thrown by the crusher drum 180. The plate also helps to prevent a positive flow of air form the conduit 150 upwardly through the conduit 186 and the crusher 160 to the plenum 90.

A third purpose is to act as a deflector for the crushed cans as they move from the conduit 186 into the conduit 150.

Figure 6:
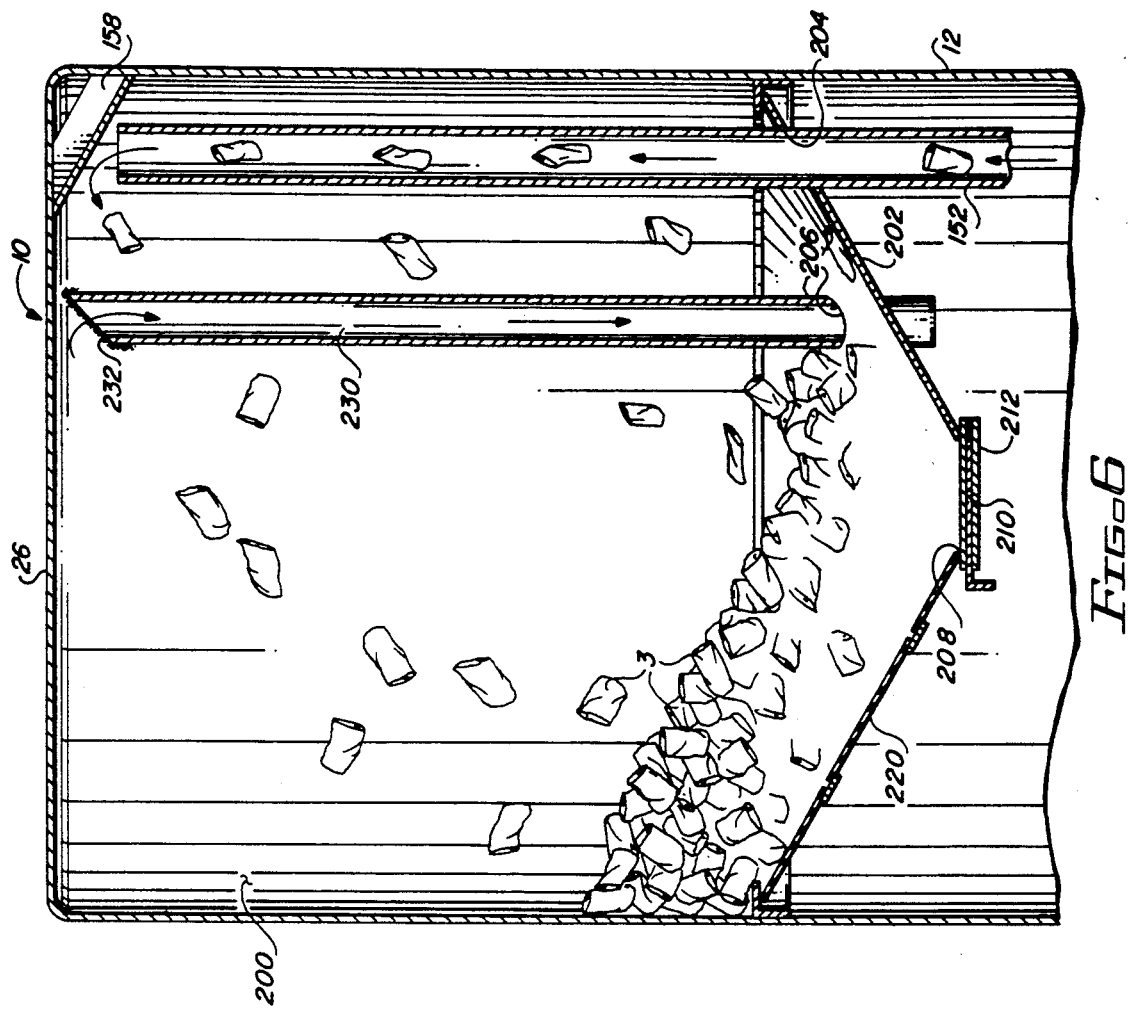
FIG. 6 is a side view in partial section schematically illustrating the conveying and storage of the crushed cans.
Figure 8:
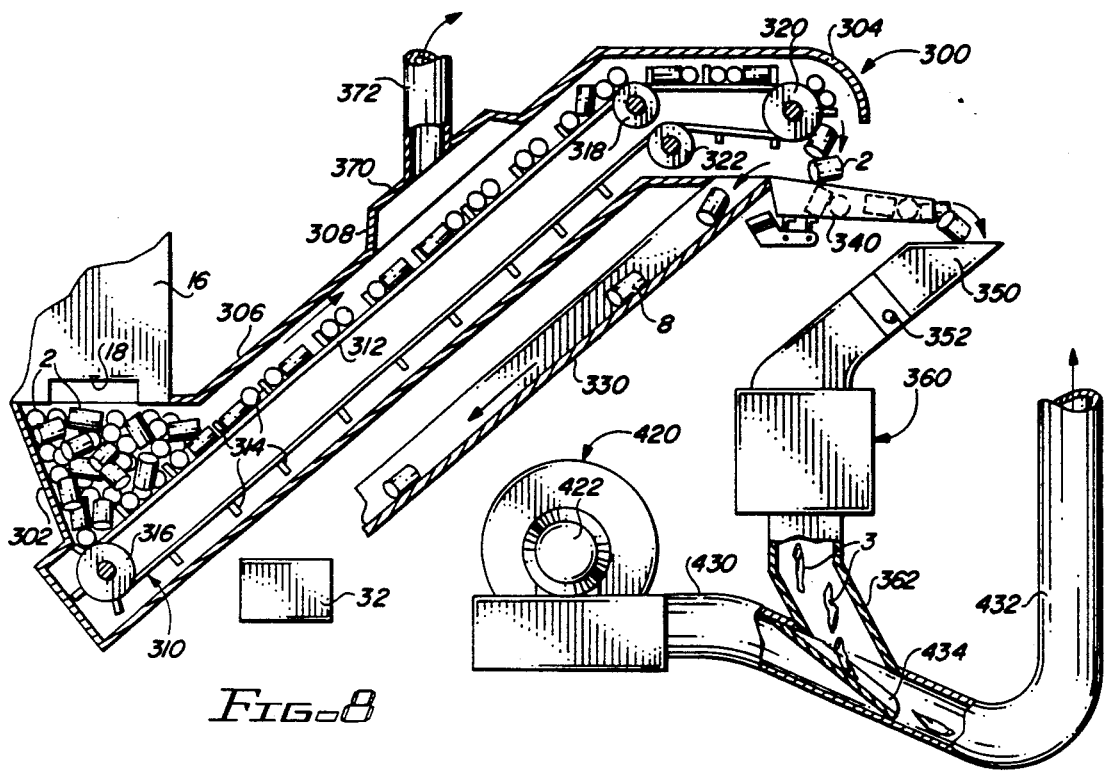
FIG. 8 is a schematic side representation of an alternate embodiment of the a portion of the apparatus of the present invention.

A venturi plate is illustrated in FIG. 8 and will be discussed in detail in conjunction therewith. The crushed cans 3 are conveyed upwardly through a vertical leg 152 of the conduit 150 to an upper storage compartment 200. The upper storage compartment 200 is shown in FIGS. 4 and 6. FIG. 6 is a view in partial section to the upper portion of the housing 12 and illustrating the storage compartment 200 and the elements associated therewith. For the following discussion, reference will primarily be made to FIGS. 2 and 6.

Initially, reference will be made to FIG. 2 and to the blower housing 142, the conduit 150, and the vertical leg 152. The air discharged from the plenum 90 flows into the blower housing 142 and out through the conduit 150. The conduit 186 extends to the conduit 150, and the crushed cans 3 flow through the conduit 186 by gravity and into the conduit 150 and into the moving air stream flowing therein.

The moving air stream blows the cans 3 upwardly through the vertical leg 152 and into the storage compartment 200 of the upper portion of the housing 112. For controlling the air flow through the conduit 152, there is a plurality of apertures 154 in the lower portion of the vertical leg 152. A sleeve 156 is disposed adjacent to the apertures 154. The sleeve 156 may be adjusted to control the airflow through a conduit 152, to prevent a positive air flow back through the conduit 186, the crusher 160, and into the plenum 90. The sleeve 156 will be discussed in more detail in conjunction with FIG. 7, and the emptying of the storage compartment 200.

In FIG. 6, the storage compartment 200 is shown extending between the top wall 26 of the housing 12 and conically configured bottom wall 202. The conical wall 202 is appropriately secured at its outer periphery to the cylindrical housing 12. The vertical leg 152 of the conduit 150 extends through an aperture 204 in the conical wall 200. There is another aperture 206 in the wall 202 for a conduit 230. The conduit 230 comprises an air discharge conduit through which air flows out of the compartment 200. The upper portion of the conduit 230 is closed by a screen 232 to prevent crushed cans from dropping through the conduit 230.

The conduit 152 extends upwardly through the storage compartment 200 and terminates adjacent to the top wall 26. A generally vee shaped deflector plate 158 is secured to the housing 12 and to the top wall 26 adjacent to the top or upper end of the conduit 152. The purpose of the deflector plate 158 is to deflect outwardly and downwardly crushed cans 3 flowing into the storage chamber 200 through the conduit 152.

At the bottom of the conical wall 200 is a discharge aperture 208. Disposed about the discharge aperture 208 is a bracket 212. A slide gate 210 moves horizontally in the bracket 212 to open and close the aperture 208.

An access door 220 is also secured to the conical wall 202 to allow access into the storage chamber 200, as required for cleaning, etc.

Figure 7:
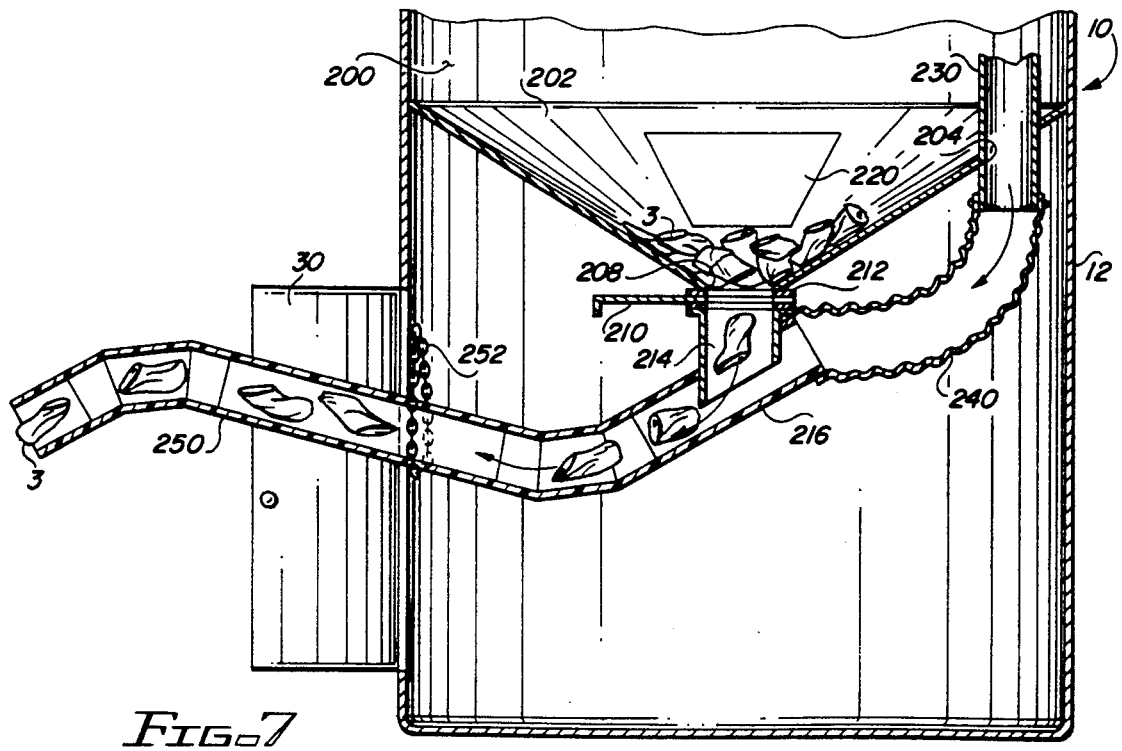
FIG. 7 is a side view in partial section schematically illustrating the transporting of the crushed cans out of the storage portion of the apparatus of the present invention.

The discharge of the cans from the storage compartment or chamber 200 is best illustrated in FIG. 7. FIG. 7 comprises a view in partial section through the housing 12 and the conical wall 202 illustrating the discharge of the cans 3 from the storage chamber 200. The elements in the lower portion of the housing 12 that are not necessary to the explanation of the discharge of the cans have been omitted from FIG. 7. For the following discussion, reference primarily will be made to FIG. 7, but reference will also be made to FIGS. 2, 5, and 6, as required.

For the discharge of the cans 3 from the storage chamber 200, the slide gate 210 is pulled outwardly from the aperture 208 after a chute 214 has been secured to the bracket 212. The chute 214 is secured to and is part of an adapter 216. The bottom portion of the chute 214 extends into the adapter 214 so that the crushed cans 3 are discharged into the air stream in the adapter 216.

A flexible conduit or hose 240 is secured to the "upper" end of the adapter 216. The free end of the hose 240 is secured to the lower or bottom end of the return air conduit 230.

A discharge pipe 250 is secured to the "lower" end of the adapter 216. The discharge pipe 250 extends outwardly through the opened door 30 from the housing 12 and to a truck, trailer, etc., into which the crushed cans 3 are discharged from the chamber 200 through the aperture 208 and the chute 214.

Referring briefly to FIG. 2, the sleeve 156 is loosened and moved downwardly, covering the apertures 154 in the conduit 152. The purpose of covering the apertures 154 is to allow the full flow of air from the blower within the housing 142 to move through the conduit 150 and 152 into the upper chamber 200. The full flow of air then moves downwardly in the conduit 230 to the hose 240 and adapter 216.

To further insure that the full force of the blown air is directed through the conduit 150 and its vertical portion 152, a slide gate 190 at the lower portion of the can crusher housing 162 is closed. The slide gate 190 is shown in its open position in FIG. 2 and also in FIG. 5.

Referring briefly to FIG. 5, a leftward movement of the slide gate 190 closes the chute or conduit 186 relative to the can crusher housing 162 to prevent air flowing in the conduit 150 from moving upwardly through the conduit 186 and through the can crusher 160 into the plenum 90. Thus, with the conduit 150, and its upward portion 152, essentially sealed, the full force of the air discharged from the blower housing 142 through the conduit 150 flows into the upper chamber 200 and downwardly through the conduit 230.

As shown in FIG. 7, the air through the conduit 230 and the flexible hose 240 flows into the adapter 216. The air then flows in the adapter 216 past the bottom of the chute 214 and into the discharge pipe 250.

The slide gate 210 is moved to its out or open position to open the aperture 208 at the bottom of conical wall 202. This allows the crushed cans 3 to flow by gravity feed downwardly through the compartment 200 and outwardly through the aperture 208 and into and through the chute 214. The air flowing through the conduit 230, the hose 240, the adapter 216, and the discharge pipe 250 blows the cans falling through the chute 214 and into the adapter 216 outwardly through the pipe 250 and into any truck or vehicle, etc., for removal from the apparatus 10.

A chain 252 is schematically illustrated in FIG. 7 disposed about a portion of the discharge pipe 250. The purpose of the chain 252 is to vary the height of the discharge pipe 250 relative to any vehicle, etc., that will receive the crushed cans 3 from the pipe 250 and transport the crushed cans for recycling.

The pipe 250 comprises a plurality of sections of straight pipe with $22\frac{1}{2}$ degree and 15 degree elbows which may be appropriately adjusted to direct the pipe from the adapter 216 outwardly from the housing 12 and to a vehicle or vessel that will receive the crushed cans 3. The discharge pipe 250 is preferably made of rigid lengths of pipe and elbows, but it may be appropriately adjusted, or raised or lowered, as required. The hose 240 is flexible so as to enable the hose to be easily installed on the bottom of the conduit 236. The hose is secured to the upstream portion of the adapter 216.

Referring again primarily to FIGS. 1 and 2, the can crusher apparatus 10 is turned "on" by a user moving a can through the opening 18 in the receiving cabinet 16. As a can moves through the opening 18 and into the receiving chute 42, its presence is sensed by the photo sensor 44. The photo sensor 44, appropriately connected to elements within the control cabinet 40, in turn sends electrical signals to a motor control cabinet 50 (see FIG. 2) which includes the appropriate elements for starting the three motors, the motor 68 for the conveyor belt 72, the motor 144 for the blower within the blower housing 142, and the motor 182 for the crusher drum 180.

A can 2 falling onto the conveyor 72 will be moved along the conveyor and will be picked up by the flow of air into the conduit 94 and transported by the flow of air in the conduit 94 to the plenum chamber apparatus 90.

The passage of the can in the conduit 94 past the can counter 95 cause two things or events to happen. The first thing is a continuous or consecutive count of the cans flowing through the conduit 94.

The second event that occurs as the result of the counter 95 is the appropriate payment to the user for the can itself. Referring again to FIG. 1, the coin or receipt dispenser 22 dispenses the appropriate money for the can, or, in the absence of money, a receipt, or the like. The can counter 95 is, of course, connected to the control circuitry within the cabinet 40.

The apparatus 10 will continue to operate until a predetermined time has elapsed after the last can has been counted or sensed by the counter 95. Upon the cessation of cans dropping through the chute 42, and after a predetermined time period to allow the "last" can to move on the conveyor 72, through the conduit 94 into the plenum 90, and through the crusher 160 and the conduits 150 and 152 into the storage chamber 200, the appropriate control circuitry will be actuated to shut off power to the electric motors.

Payment through the dispenser 22 may be made either on an individual can basis or on the basis of the total number cans by a single user, as desired. It will be noted that only the aluminum cans moving in the conduit 94, which are counted by the counter 95, are paid for. Thus, ferrous metal cans that remain on the conveyor 72 and pass outwardly through the discharge opening 32 by means of the chute 34 are neither counted nor paid for. Such a ferrous can would only be counted and paid for if, for some reason, the can did not remain magnetically secured to the belt 72 and inadvertently moved upwardly through the conduit 94. However, such an occurrence is relatively unlikely.

Referring to FIG. 7, the blower motor 144 may be selectively energized or turned on by the maintenance person who connects the hose 240, the adapter 216, the chute 214, and the pipe 250 to the "permanent" elements, such as the conduit 230 and the bracket 212, for the discharge of the crushed cans 3 outwardly from the apparatus 10. The blower motor 144 may be selectively energized by actuation of an appropriate switch on or in the motor control cabinet 50. Such is well known and understood, as are all the details of the electrical elements incorporated into the apparatus 10 of the present invention.

Figure 9:
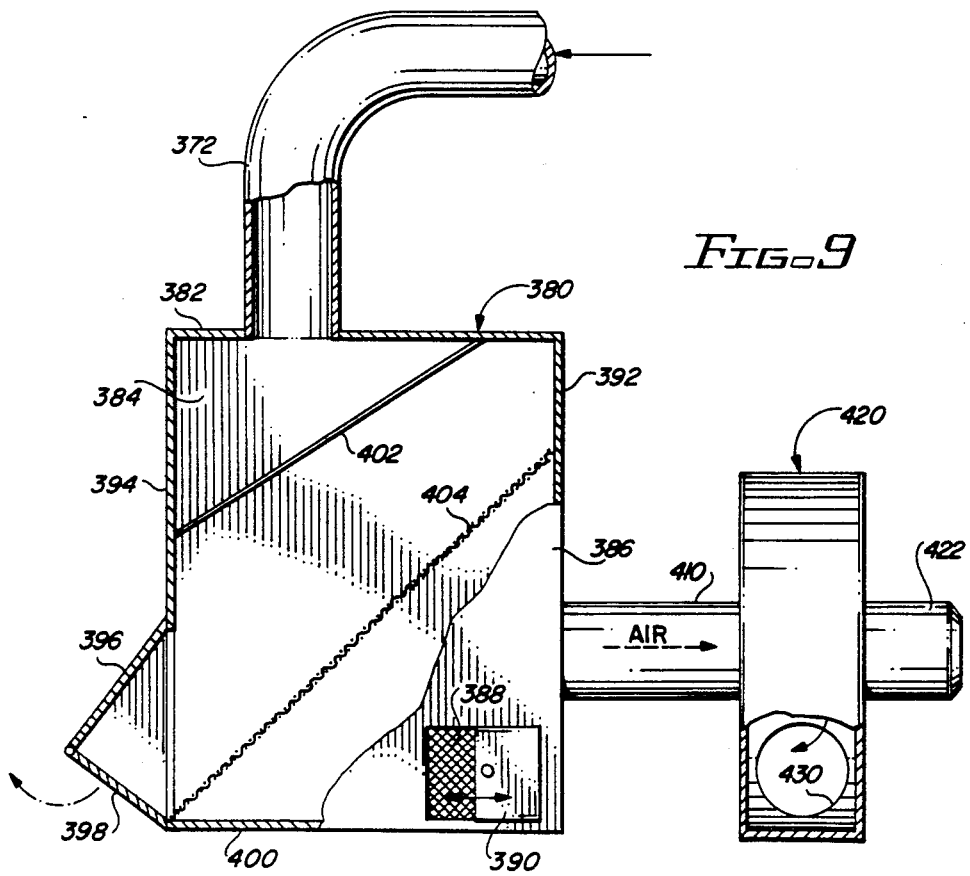
FIG. 9 is a side view in partial section schematically illustrating a portion of the apparatus of FIG. 8.

FIG. 8 is a side schematic representation of an alternate embodiment 300 of the apparatus of the present invention. FIG. 9 is a side view in partial section of a portion of the apparatus 300 of FIG. 8. For the following discussion, reference will be primarily be made to FIGS. 8 and 9. Reference may also be made to FIGS. 1 and 2, as required.

Can crusher apparatus 300 of FIGS. 8 and 9 comprises a alternate embodiment of a portion of the crusher apparatus 10, in which a mechanical conveyor 310 conveys cans to a vibratory feeder 340, and the cans fall by gravity from the vibratory feeder 340 to and through a can conduit 350 to a crusher 360. The crusher 360 is substantially identical to the crusher 160 discussed above. However, the conveyor 310 replaces the conveyor 60, the conduit 94, and the plenum 90 of the apparatus 10.

Disposed beneath the opening 18 in the cabinet 16 is a hopper 302. The hopper 302 is disposed adjacent to the lower portion of the conveyor 310. The hopper 302 and the conveyor 310 include a pair of side panels, of which a side panel 304 is shown in FIG. 8. The side panels are disposed adjacent to the conveyor 310 so that the cans 2 may remain on the conveyer 310 to be transported to the vibratory feeder 340.

The conveyor 310 includes an endless belt 312 which includes a plurality of cleats 314 extending transversely with respect to the endless belt 312. The cleats 314 help to hold the cans 2 on the belt as the belt 312 moves.

The belt 312 extends about several pulleys, including a lower or bottom idler pulley 316 and an upper idler pulley 318. Disposed adjacent to the upper idler pulley 318 is an outer or end drive pulley 320. The drive pulley 320 is magnetic so that steel or ferrous metal can will remain on the belt 312 until the belt clears the vibratory feeder 340. The vibratory feeder 340 is disposed generally beneath and adjacent to the outer magnetic drive pulley 320. The aluminum cans will fall directly from the belt 312 as the belt 312 moves around the pulley 320. The feeder 340 is disposed beneath the pulley 320.

An end panel 304 is disposed over the end of the belt 312 adjacent to the drive pulley 320. The panel 304 extends between the side panels to help insure that the cans 2 fall onto the feeder 340 from the belt 312.

Spaced beneath the pulleys 318 and 320 is a return idler pulley 322. The purpose of the return pulley 322 is simply to allow the belt 310 to move about the pulley 320 and back to the pulley 316. That is, the belt 310 is disposed about the pulley 320 for about one hundred ninety degrees, and extends to and over the pulley 322 and then back to the bottom pulley 316.

A trash suction head 370 is disposed over the belt 312 between the idler pulleys 316 and 318. The suction head 370 will be discussed in more detail below.

The ferrous metal cans 8 remain on the belt 310 past the magnetic pulley 320 and when the cans are out of the magnetic field of the pulley 320, they fall into a reject chute 330. The reject chute 330 terminates in the discharge opening 32, schematically illustrated in FIG. 8.

The aluminum cans 2 drop from the belt 310 onto the vibratory feeder 340, and from the feeder 340 they drop into the can conduit 350 through which they fall to the crusher 360. A can counter 352 is disposed about the conduit 350. The counter 352 may be an inductive counter, such as the counter 95 discussed above and as disposed about the conduit 94. The counter 352 only counts the aluminum cans falling through the conduit 350. An appropriate signal is transmitted from the counter 352, for counting purposes and payment purposes, all as discussed above.

The crushed cans 3 are thrown into a conduit 362 which extends to a conduit 430. The conduit 430 is on the discharge side of a blower assembly 420. The blower assembly 420, with its motor 422, is substantially identical to the blower 142 and its motor 144, discussed above in conjunction with the apparatus 10.

There is a curved centrum plate 434 in the conduit 430 beneath the juncture of the conduit 362, and the conduit 430. The plate 434 has a somewhat concave upper surface against which the crushed cans 3 impinge. The plate 434 causes the crushed cans to deflect into the air flow through the conduit 430. The plate 434 also accelerates the flow of air past the conduit 362. A major purpose of the plate 434 is to prevent the air flowing in the conduit 430 to flow upwardly through the conduit 362 to the crusher 360 and through the conduit 350.

The trash suction head 370 is disposed adjacent to the belt 310 between the pulleys 316 and 318. The suction head 370 serves as an air intake or air inlet for the blower 420. A conduit 372 extends from the suction head 370 to a plenum or cleaner box 380. shown in FIG. 9. The cleaner box 380 is substantially identical to the lower portion of the plenum 90, discussed above. The cleaner box or plenum 380 is a generally rectangular element which includes a top plate 382 to which the conduit 372 extends. An aperture in the top 382 allows for communication between the conduit 372 and the box 380.

Air flowing into the head 370 picks up trash, such as leaves, bags, etc., as discussed above. The trash flows through the conduit 372 with the flow of air and into the interior of the box 380 through the aperture in the top plate 382.

The box 380 includes two sides or side plates, a side 384 and a side 386. At the lower portion of the side 386 there is a screened aperture 388. A vacuum control plate 390 is disposed adjacent to the aperture 388 and may be appropriately moved over the aperture 388 to control the extent of the vacuum within the cabinet 380 and accordingly through the head 370 and the conduit 372. The control plate is movable to adjust the extent of the vacuum or suction force by the blower 420 through the box 380 and through the conduit 372 and the head 370 and outwardly, as discussed below, for conveying the crushed cans 3.

The box 380 also includes a back plate 392 and a front plate 394. At the lower portion of the front plate 394 is a trash chute 396. The chute 396 is controlled by a door 398. The door 398 opens to allow the trash in the chute 396 to be removed when the blower 420 turns off. The vacuum or suction from the blower closes the door 398.

The box 380 also includes a bottom 400. The vacuum adjustment plate 390 and the screened aperture 388 are disposed adjacent to the bottom 400 and the back 392.

A conduit 410 extends from the lower portion of the back plate or wall 392 to the blower 420.

Within the box 390, and extending generally between the top plate 382 adjacent to the back plate 392 and the front plate or wall 394 above the trash chute 396 is a plurality of rods 402. The rods 402 are spaced apart from each other to allow for the flow of air between them. The rods serve primarily to stop large elements, such as bags, from flowing through the box 380 and onto a trash screen 404. The trash screen 404 extends diagonally, somewhat parallel to the rods 402, between the walls 384 and 386 and from about the juncture of the bottom 400 of the front wall 394 upwardly to the back wall or plate 394. Leaves and other trash and debris that fall between the rods 402 will impinge on the screen 404. The slope of the screen 404 is relatively steep to encourage or allow the trash to fall downwardly toward the chute 396.

Air flowing from the head 370 and through the conduit 372 into the interior of the box 380 flows through the screen 404 and out of the box 380 through the conduit 410 to the blower 420. A conduit 430 extends from the blower 402 to a generally vertical extending leg 432.

The conduit 362 from the crusher 360 extends to the conduit 430. The crushed cans 3 fall by gravity in the conduit 362 to the conduit 430. The crushed cans 3 are then blown by the flow of air through the conduit 430 from the blower 420 upwardly through the vertical leg conduit 432 and into the storage compartment area in a upper portion of the housing in which the apparatus 300 is disposed, such as the housing 12 and the storage compartment 200 of the apparatus 10.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What we claim is:

1. Can crusher apparatus, comprising, in combination:
    means for receiving cans, including
        a conveyor for transporting cans and trash, and means for sorting ferrous metal cans from aluminum cans to be crushed from the received and transported cans;
    plenum chamber means for receiving the cans to be crushed and for sorting trash from the cans to be crushed;
    crusher means for crushing the cans separated from trash in the plenum chamber means;
    means for conveying the cans to be crushed from the plenum chamber means to the crusher means;
    storage compartment means disposed above the crusher means for storing the crushed cans;
    means for transporting the crushed cans upwardly from the crusher means to the storage compartment means, including
        blower means for providing a flow of air,
        a first conduit extending from the blower means to the storage compartment means for receiving the flow of air, and
        a second conduit extending from the crusher means to the first conduit and through which the crushed cans fall into the flow of air in the first conduit; and
    means for conveying the crushed cans out of the storage compartment means, including
        an opening through which the crushed cans fall from the storage compartment means;
        a third conduit extending outwardly from the storage compartment means for receiving the flow of air from the first conduit;
        discharge pipe means connected to the opening for receiving the crushed cans from the storage compartment means; and
        hose means extending between the third conduit and the discharge pipe means through which the air flows to blow the crushed cans through the discharge pipe means.

2. The apparatus of claim 1 in which the means for receiving cans further includes a housing, and the conveyor, the means for sorting, the plenum chamber means, and the crusher means are disposed in the housing.

3. The apparatus of claim 2 in which the storage compartment means is also in the housing.

4. The apparatus of claim 1 in which the means for sorting ferrous metal cans from aluminum cans includes magnetic means adjacent to the conveyor for retaining ferrous metal cans on the conveyor, and chute means adjacent to the conveyor for receiving the ferrous metal cans and for discarding the ferrous metal cans.

5. The apparatus of claim 1 in which the plenum chamber means includes a plenum and a conduit extending from the conveyor to the plenum, and the aluminum cans move in the conduit from the conveyor to the plenum.

6. The apparatus of claim 5 in which the plenum chamber means further includes a chute extending from the plenum to the crusher means.

7. The apparatus of claim 1 in which the plenum chamber means includes
    a plenum,
    a fourth conduit extending from the conveyor to the plenum, a fifth conduit extending from the plenum to the blower means, and the flow of air is through the fourth conduit, the plenum, the fifth conduit, the blower means, and to the first conduit for moving the aluminum cans from the conveyor to the plenum.

8. The apparatus of claim 1 in which the means for receiving cans includes control means for controlling the conveyor, the crusher means, and the means for transporting the crushed cans in response to a received can.

9. Apparatus for receiving and crushing cans to be recycled, comprising, in combination:

means for receiving trash and cans to be crushed;

plenum chamber means for sorting trash from the cans to be crushed;

means disposed below the plenum chamber means for crushing the cans separated from the trash for recycling;

means for conveying by gravity the received cans from the plenum chamber means to the means for crushing the cans;

storage means for storing the crushed cans disposed above the means for receiving the cans, the plenum chamber means, the means for crushing the cans, and the means for conveying the received cans to the means for crushing the cans; and means for conveying the crushed cans from the means for crushing the cans to the storage means.

10. The apparatus of claim 9 in which the storage means includes means for removing the crushed cans for recycling.

11. The apparatus of claim 9 in which the means for conveying the received cans to the means for crushing the cans includes a conveyor extending from the means for receiving cans to the means for crushing the cans.

12. The apparatus of claim 9 in which the means for conveying the received cans to the means for crushing the cans includes a conveyor, a plenum in the plenum chamber means, a first conduit extending from the conveyor to the plenum, a second conduit extending from the plenum to the means for crushing the cans through which the cans move by gravity, and means for providing a flow of air in the first conduit for moving the cans from the conveyor to the plenum.

13. The apparatus of claim 9 which includes means for separating the received cans into desired cans and undesired cans.

14. The apparatus of claim 13 in which the means for conveying the received cans further includes means for counting the desired cans.

15. The apparatus of claim 14 in which the means for conveying the received cans further includes means for paying for the desired cans.

16. Apparatus for receiving and crushing cans to be recycled, comprising, in combination:

means for receiving trash and cans to be crushed;

plenum chamber means for sorting trash from the cans to be crushed, including an upper portion for receiving the trash and cans to be crushed, a lower portion to which the trash falls by suction from the upper portion, and a conduit through which the cans move by gravity from the upper portion;

means for crushing the cans disposed below the conduit of the plenum chamber means;

storage means for storing the crushed cans disposed above the means for receiving the trash and the cans, the plenum chamber means, and the means for crushing the cans; and means for conveying the crushed cans from the means for crushing the cans to the storage means.

17. The apparatus of claim 16 in which the means for receiving the trash and cans to be crushed includes means for conveying the trash and cans to be crushed to the plenum chamber means.

18. The apparatus of claim 17 in which the means for conveying the trash and cans to be crushed includes means for counting the cans to be crushed.

19. The apparatus of claim 18 in which the means for conveying the trash and cans to be crushed further includes means for paying for the cans to be crushed.

* * * * *